A. CHABOT.
APPARATUS FOR FILTERING WATER, &c.
No. 40,818. Patented Dec. 8, 1863.
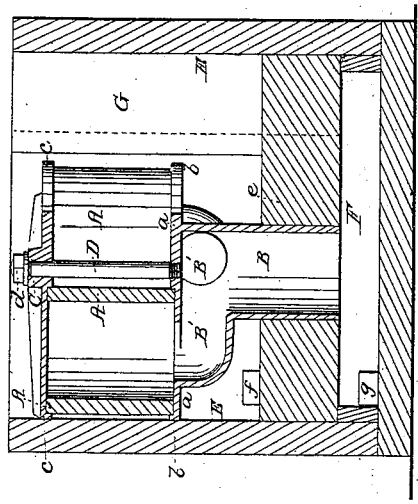
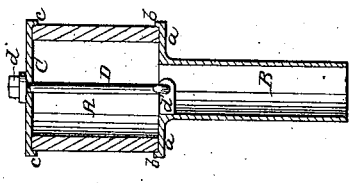
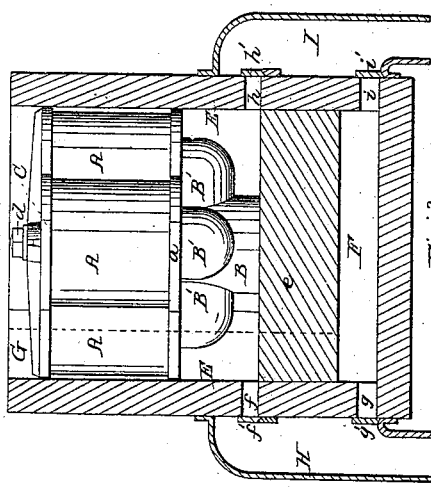
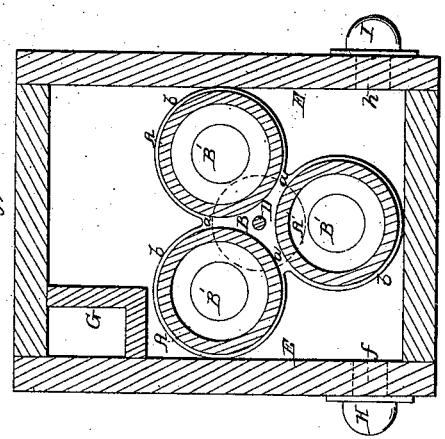
Witnesses:
Inventor,

UNITED STATES PATENT OFFICE.

ANTHONY CHABOT, OF SAN FRANCISCO, CALIFORNIA.

IMPROVEMENT IN FILTERS.

Specification forming part of Letters Patent No. 40,818, dated December 8, 1863.

*To all whom it may concern:*

Be it known that I, ANTHONY CHABOT, of San Francisco, in the county of San Francisco and State of California, have invented certain new and useful Improvements in Apparatus for Filtering Water and other Liquids; and I do hereby declare that the following is a full, clear, and exact description of the same, reference being had to the accompanying drawings, forming part of this specification, in which—

Figure 1 is a central vertical section of a filtering apparatus constructed according to my invention. Fig. 2 is a vertical section of the casing of the apparatus at right angles to Fig. 1, but exhibits an outside view of the filters themselves. Fig. 3 is a horizontal section of the apparatus. Fig. 4 is a vertical section of one of my filters constructed in its simplest form.

Similar letters of reference indicate corresponding parts in the several figures.

This invention consists in a novel mode of applying porous tubes for filtering purposes, whereby they are secured in their places with great facility, and their strength greatly increased, and provision is made for a very free flow of water to, through, and from them; also in the arrangement of a filter or filters, and the chambers or passages for conveying the water to and from them in such manner as to provide for the cleansing of the filters by reversing the flow of water through them.

To enable others skilled in the art to make and use my invention, I will proceed to describe its construction and operation.

I will first describe the simplest form of the filter shown in Fig. 4.

A is the porous tube made of any material sufficiently porous for the purpose.

B is a metal pipe smaller than the tube A, and made with a flange, *a*, at its upper end, and a rim, *b*, around the said flange to receive the lower end of the porous tube within it.

C is a metal cap made with a rim, *c*, to receive within it the upper end of the tube A.

D is a bolt attached by a hook or screw at its lower end to a lug, *d'*, formed within the upper part of the pipe B, and passing through the center of the tube A and through a hole in the center of the cap C, and secured by a nut, *d*, at the top.

The joint between the ends of the tube and the flange *a* and cap C may be made with cement, india-rubber, sulphur, rosin, or other suitable material, and the central bolt serves to secure the whole together and to clamp the tube between the head and cap in such manner as to give it additional strength and enable it to stand a much greater pressure of water than when not so clamped.

The bolt D may have a bend or crook formed in it, to give it a certain degree of elasticity in a longitudinal direction.

In Figs. 1, 2, 3 three porous tubes, A A A, are attached to a single pipe, B, by one cap, C, and one central bolt, D. The pipe B is made with three branches, B′ B′ B′, which are connected by a single flange, *a*, and the cap C is made of a form and size to cover the three porous tubes arranged over the said branches of the pipe, and the flange and cap are provided with rims *b* and *c* to receive the tubes. The bolt D in this case is arranged centrally between the three tubes, as shown in Fig. 3, and screwed into the flange *a*, and passes through a hole in the center of the cap, above which it is secured by the nut *d* to clamp the porous tubes, as before described.

E, Figs. 1, 2, and 3, is a tank, of wood, iron, or masonry, furnished at some distance from its bottom with a tight floor or arch, *e*, to form a chamber, F. At one side or corner of this tank there is formed a trunk, G, which has no communication with the body of the tank, but communicates with the chamber F, and in one side of the tank there are provided two openings, *f* and *g*, one above and the other below the floor *e*, and these openings both communicate with one pipe, H, which serves to carry off the filtered water, and in the opposite side of the tank to the openings *f* and *g* there are provided two openings, *h* and *i*, one above and the other below the floor *e*, and these openings both communicate with one pipe, I, which serves to carry off the dirty water and impurities in cleaning the filters. The several openings *f g h i* are furnished with separate gates or valves *f′ g′ h′ i′*, which can be opened and closed by any suitable means provided for the purpose. The pipe B is set tightly into an opening provided for its reception in the floor or arch e, as shown in Fig. 1, but should not project below it, and the said pipe should be of such height that the flange a is at some distance above the floor or arch. The tank is deep enough to reach a little above the tops of the porous tube or tubes.

To set the apparatus in operation, first close the gates $f'$, $g'$, and $h'$, and open $i'$, and admit the water to be filtered into the tank E, but not into the tank G. The water will then percolate through the porous tube or tubes from the exterior to the interior thereof, and pass through the pipe B and chamber F, and off through the opening $i$, and carry off with it all the dirt and impure matter from the interior of the said tubes, pipe, and chamber, and when it runs off clear from the opening $i$ the gate $i'$ is to be closed and $g'$ opened, and the clear filtered water then passes through the opening $g$ and off by the pipe H, leaving the impurities on the exteriors of the porous tubes and within the tank E. When the apparatus has been so long in operation in this way, with the water percolating through the porous tubes from the exteriors to the interiors thereof that so much dirt or impurity has collected upon the exteriors of the porous tubes and within the tank as to render it desirable to cleanse them, the gate $g'$ is closed and $h'$ is opened, and the water to be filtered is allowed to run into the trunk G and not into the body of the tank, and it then passes down the trunk and into the chamber F, thence upward through the pipe B, to the interiors of the tubes A A A, through which it percolates in an outward direction into the tank, washing off the dirt and impurities from the exteriors of the said tubes and interior of the tank, and carrying it off through the opening $h$, and as soon as it begins to run off clear at the said opening the gate $h$ is closed and $f'$ is opened, and the clear filtered water then passes through the opening $f$ and off by the pipe H. When so much dirt and impurity has collected within the interiors of the tubes A A A, pipe B, and chamber F as to render it desirable to cleanse them, the gate $f$ is closed and $i'$ is opened, and the water to be filtered is allowed to run into the tank E, but not into the trunk G, and the impurities are carried off through the opening $i$, as at first described, and when it runs off clear at $i$, the gate $i'$ is closed and $g'$ opened, and the filtering of the water again proceeds, by its percolation through the tubes A A A, in an inward direction.

The reversal of the flow of water and cleansing of the filters may be effected once a day, or as often as may be desirable, according to the greater or less degree of impurity of the water to be filtered.

This apparatus is well adapted for waterworks for the supply of cities and towns, and any number of porous tubes and pipes may be arranged in one tank. I do not propose to make the porous tubes of large caliber, but to increase the number according to the required capacity of the apparatus.

If the water is pumped from a river or lake the whole of the tank above the floor $e$ and the whole of the trunk G may be dispensed with, and no opening will be required in the floor, except for the reception of the pipes B. The opening $i$ will also be dispensed with, and the opening $g$ will be connected directly with the pump, which will draw the water through the filters, the pipe B, and chamber F. To provide for the cleansing of the filters in this case, I employ in connection with the pipe which connects the opening $g$ with the pump an elevated tank of filtered water, and when it is required to cleanse the filters the pump is stopped and the pipe from the elevated tank opened, to allow the water from the said tank to flow through the chamber F, thence up through the pipes B into and in an outward direction through the filters, and thereby wash away the impurities from the outer surfaces of the filters.

If the apparatus be in a river the natural current will carry away the impurities; but if it be in a lake or still water an artificial agitation may be produced for the purpose by opening another pipe from the elevated tank to deliver water among the filters. When the filters have been cleansed, the pipe or pipes from the elevated tank are closed and the pump started again, and the filtering proceeds as at first described.

If the water be brought to the city or place of distribution by a conduit to a distributing-reservoir, the tank may be suitably arranged to receive the water from the conduit, and the pipe H be made to deliver directly to the reservoir, or the tank arranged to receive the water from the reservoir, and the pipe H be connected directly with the main, and the pipe I deliver into a sewer or other suitable receptacle for the impurities.

Two, three, or a larger number of porous tubes may be connected with one pipe, B, in the manner described with reference to Figs. 1, 2, and 3; but whether a single tube only or a larger number be connected with one pipe, the pipes being smaller than the tubes and rising above the floor $e$, plenty of room is left between the said pipes for the free passage of the water or for the collection of impurities.

The tubes A A may be arranged in horizontal or inclined positions instead of vertically, as represented.

I do not claim, broadly, the use of porous tubes for filtering purposes; but

What I claim as my invention, and desire to secure by Letters Patent, is—

1. Combining one or more porous tubes with a pipe, B, by means of a flange, $a$, on the pipe for the reception of one end of each tube, a cap, C, for the reception of the other end, and a bolt, D; substantially as herein described.

2. In a filtering apparatus, constructed substantially as specified, the herein-described arrangement of chamber or chambers and passages for conveying the water to and from them, operating, as explained, to provide for the cleansing of the filters by reversing the flow of water through them without reversing or changing the position of the filter or filters.

3. The combination and arrangement of the porous tube or tubes A, pipe or pipes B, tank E, trunk G, chamber F, openings $f\ g\ h\ i$, and gates or valves $f'\ g'\ h'\ i'$, to operate substantially as and for the purpose herein specified.

A. CHABOT.

Witnesses:
M. M. LIVINGSTON,
DANIEL ROBERTSON.